United States Patent
Kim et al.

(10) Patent No.: US 9,986,540 B2
(45) Date of Patent: May 29, 2018

(54) METHOD AND DEVICE FOR REMOVING INTERFERENCE FROM WIRELESS COMMUNICATION SYSTEM AND RECEIVING DATA

(71) Applicant: LG ELECTRONICS INC., Seoul (KR)

(72) Inventors: Hyungtae Kim, Seoul (KR); Hyunho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 2 days.

(21) Appl. No.: 15/113,405

(22) PCT Filed: Mar. 11, 2015

(86) PCT No.: PCT/KR2015/002345
§ 371 (c)(1),
(2) Date: Jul. 21, 2016

(87) PCT Pub. No.: WO2015/137718
PCT Pub. Date: Sep. 17, 2015

(65) Prior Publication Data
US 2017/0013609 A1    Jan. 12, 2017

Related U.S. Application Data

(60) Provisional application No. 61/950,840, filed on Mar. 11, 2014.

(51) Int. Cl.
*H04W 72/08* (2009.01)
*H04W 72/04* (2009.01)
(Continued)

(52) U.S. Cl.
CPC ...... *H04W 72/0413* (2013.01); *H04B 7/0478* (2013.01); *H04B 17/24* (2015.01);
(Continued)

(58) Field of Classification Search
CPC .......... H04W 72/082; H04W 72/0413; H04W 52/244; H04W 72/085; H04W 72/1226;
(Continued)

(56) References Cited

U.S. PATENT DOCUMENTS

2013/0195053 A1* 8/2013 Jeon .................. H04W 72/0406
370/329
2013/0301560 A1* 11/2013 Geirhofer ............ H04B 7/0621
370/329

(Continued)

FOREIGN PATENT DOCUMENTS

| JP | 2014033271 | 2/2014 |
| WO | 2013042883 | 3/2013 |
| WO | 2013048030 | 4/2013 |

OTHER PUBLICATIONS

LG Electronics "Details of CSI Measurement and Report for TDD eIMTA," 3GPP TSG-RAN WG1 #74, R1-134386, Oct. 2013, 4 pages.

(Continued)

*Primary Examiner* — Lester Kincaid
*Assistant Examiner* — Gary Lafontant
(74) *Attorney, Agent, or Firm* — Lee, Hong, Degerman, Kang & Waimey

(57) ABSTRACT

The present invention relates to a wireless communication system. A method of removing interference and receiving data by means of a terminal in a wireless communication system according to an embodiment of the present invention may include: transmitting first generic channel state information (CSI) generated based on required signal power from a serving cell; transmitting second generic CSI generated based on interference signal power from an interference cell; and receiving data generated based on CSI recalculated by (Continued)

using an interference condition that has changed after the transmission of the first and second generic CSI.

12 Claims, 13 Drawing Sheets

(51) Int. Cl.
*H04B 17/24* (2015.01)
*H04B 17/336* (2015.01)
*H04B 7/04* (2017.01)
*H04L 5/00* (2006.01)
*H04W 52/24* (2009.01)

(52) U.S. Cl.
CPC ......... *H04B 17/336* (2015.01); *H04L 5/0023* (2013.01); *H04L 5/0032* (2013.01); *H04L 5/0053* (2013.01); *H04L 5/0057* (2013.01); *H04W 52/243* (2013.01); *H04W 72/082* (2013.01); *H04L 5/0048* (2013.01)

(58) Field of Classification Search
CPC ........... H04W 72/1231; H04W 52/242; H04W 52/243
See application file for complete search history.

(56) References Cited

U.S. PATENT DOCUMENTS

2014/0016691 A1* 1/2014 Bultan ................... H04B 1/123
375/232
2015/0189603 A1* 7/2015 Weber ................... H04W 24/08
370/252

OTHER PUBLICATIONS

CATT,"Summary of email discussion [74bis-02] CSI measurement and report for eIMTA," 3GPP TSG-RAN WG1 #75, R1-135054, Nov. 2013, 15 pages.
PCT International Application No. PCT/KR2015/002345, Written Opinion of the International Searching Authority dated May 19, 2015, 24 pages.

* cited by examiner

FIG. 5
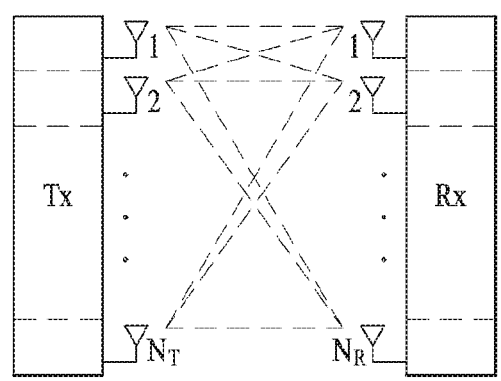
(a)
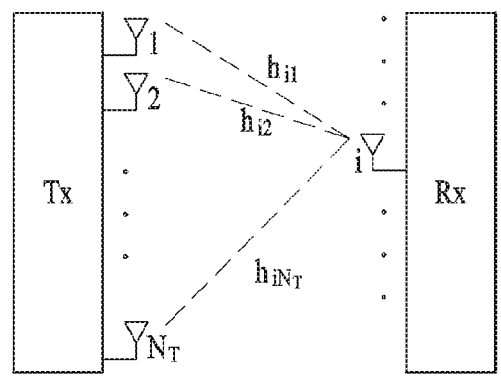
(b)

METHOD AND DEVICE FOR REMOVING INTERFERENCE FROM WIRELESS COMMUNICATION SYSTEM AND RECEIVING DATA

CROSS-REFERENCE TO RELATED APPLICATIONS

This application is the National Stage filing under 35 U.S.C. 371 of International Application No. PCT/KR2015/002345, filed on Mar. 11, 2015, which claims the benefit of U.S. Provisional Application No. 61/950,840, filed on Mar. 11, 2014, the contents of which are all hereby incorporated by reference herein in their entirety.

TECHNICAL FIELD

The present invention relates to a wireless communication system, and more particularly, to a method of removing interference and receiving a signal in a wireless communication system and an apparatus therefor.

BACKGROUND ART

Multiple input multiple output (MIMO) increases the efficiency of data transmission and reception using multiple transmit antennas and multiple receive antennas instead of a single transmission antenna and a single reception antenna. A receiver receives data through multiple paths when multiple antennas are used, whereas the receiver receives data through a single antenna path when a single antenna is used. Accordingly, MIMO can increase a data transmission rate and throughput and improve coverage.

A single cell MIMO scheme can be classified into a single user-MIMO (SU-MIMO) scheme for receiving a downlink signal by a single UE in one cell and a multi user-MIMO (MU-MIMO) scheme for receiving a downlink signal by two or more UEs.

Channel estimation refers to a procedure for compensating for signal distortion due to fading to restore a reception signal. Here, the fading refers to sudden fluctuation in signal intensity due to multipath-time delay in a wireless communication system environment. For channel estimation, a reference signal (RS) known to both a transmitter and a receiver is required. In addition, the RS can be referred to as a RS or a pilot signal according to applied standard.

A downlink RS is a pilot signal for coherent demodulation for a physical downlink shared channel (PDSCH), a physical control format indicator channel (PCFICH), a physical hybrid indicator channel (PHICH), a physical downlink control channel (PDCCH), etc. A downlink RS includes a common RS (CRS) shared by all user equipments (UEs) in a cell and a dedicated RS (DRS) for a specific UE. For a system (e.g., a system having extended antenna configuration LTE-A standard for supporting 8 transmission antennas) compared with a conventional communication system (e.g., a system according to LTE release-8 or 9) for supporting 4 transmission antennas, DRS based data demodulation has been considered for effectively managing RSs and supporting a developed transmission scheme. That is, for supporting data transmission through extended antennas, DRS for two or more layers can be defined. DRS is pre-coded by the same pre-coder as a pre-coder for data and thus a receiver can easily estimate channel information for data demodulation without separate precoding information.

A downlink receiver can acquire pre-coded channel information for extended antenna configuration through DRS but requires a separate RS other than DRS in order to non-precoded channel information. Accordingly, a receiver of a system according to LTE-A standard can define a RS for acquisition of channel state information (CSI), that is, CSI-RS.

DISCLOSURE

Technical Problem

An object of the present invention is to provide a method of removing interference and receiving a signal in a wireless communication system and an apparatus therefor based on the aforementioned discussion.

The technical objects that can be achieved through the present invention are not limited to what has been particularly described hereinabove and other technical objects not described herein will be more clearly understood by persons skilled in the art from the following detailed description.

Technical Solution

To solve the problem, a method for removing interference and receiving data by means of a UE in a wireless communication system according to one embodiment of the present invention comprises the steps of transmitting first generic channel state information (CSI) generated based on a desired signal power from a serving cell; transmitting second generic CSI generated based on an interference signal power from an interference cell; and receiving data generated based on CSI recalculated by using an interference condition changed after the first generic CSI and the second generic CSI are transmitted.

The first generic CSI may be determined by the following Equation:

$$CQI1 = Q(Ps/Noc), \qquad \text{[Equation A]}$$

where Q means a quantization function, Noc means a power of the other signals except a signal of the interference cell and a signal of the serving cell, and Ps means the desired signal power.

The second generic CSI may be determined by the following Equation:

$$CQI2 = Q(PI/Noc), \qquad \text{[Equation B]}$$

where PI means the interference signal power.

The recalculated CSI may be determined by the following Equation:

$$\text{Recalculated CSI} = CSI1(1+\text{Alpha}*CSI2), \qquad \text{[Equation C]}$$

where Alpha means the changed interference condition.

The interference cell may be determined as a neighbor cell having the greatest reference signal received power (RSRP) among at least one neighbor cells having traffic in a CSI reference resource.

The second generic CSI may be transmitted at one subframe together with the first generic CSI as a difference value from the first generic CSI if a rank of the UE is 1.

The method may further comprise the steps of determining that transmission of the first generic CSI and the second generic CSI is enabled if the UE is limited to a rank 1 by codebook subset restriction; and determining that transmission of the first generic CSI and the second generic CSI is disabled if the UE is not limited to a rank 1 by codebook subset restriction.

A UE configured to remove interference and receive data in a wireless communication system according to another embodiment of the present invention comprises radio frequency (RF) units; and a processor, wherein the processor is configured to transmit first generic channel state information (CSI) generated based on a desired signal power from a serving cell, transmit second generic CSI generated based on an interference signal power from an interference cell, and receive data generated based on CSI recalculated by using an interference condition changed after the first generic CSI and the second generic CSI are transmitted.

The first generic CSI may be determined by the following Equation:

$$CQI1=Q(Ps/Noc),\qquad\text{[Equation A]}$$

where Q means a quantization function, Noc means a power of the other signals except a signal of the interference cell and a signal of the serving cell, and Ps means the desired signal power.

The second generic CSI may be determined by the following Equation:

$$CQI2=Q(PI/Noc),\qquad\text{[Equation B]}$$

where PI means the interference signal power.

The recalculated CSI may be determined by the following Equation:

$$\text{Recalculated CSI}=CSI1(1+\text{Alpha}*CSI2),\qquad\text{[Equation C]}$$

where Alpha means the changed interference condition.

The interference cell may be determined as a neighbor cell having the greatest reference signal received power (RSRP) among at least one neighbor cells having traffic in a CSI reference resource.

The second generic CSI may be transmitted at one subframe together with the first generic CSI as a difference value from the first generic CSI if a rank of the UE is 1.

The processor may determine that transmission of the first generic CSI and the second generic CSI is enabled if the UE is limited to a rank 1 by codebook subset restriction, and may determine that transmission of the first generic CSI and the second generic CSI is disabled if the UE is not limited to a rank 1 by codebook subset restriction.

Advantageous Effects

According to the embodiment of the present invention, a method of removing interference and receiving a signal by means of a UE in a wireless communication system and an apparatus therefor can be provided.

It will be appreciated by persons skilled in the art that that the effects that can be achieved through the present invention are not limited to what has been particularly described hereinabove and other advantages of the present invention will be more clearly understood from the following detailed description.

Information-Reference Signal may be used.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 5 is a schematic diagram illustrating a wireless communication system having multiple antennas;

BEST MODE FOR CARRYING OUT THE INVENTION

Figure 1:
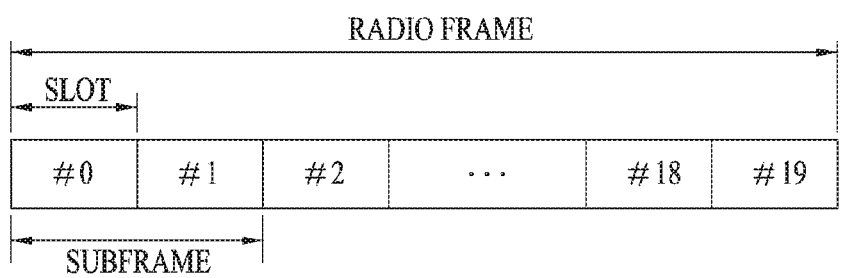
FIG. 1 is a diagram illustrating an example of a structure of a downlink radio frame.

The embodiments described below correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention.

In the description of the present invention, the embodiments of the present invention will be described by mainly focusing on the data transmission and reception relation between a base station and a user equipment. Herein, the base station may refer to a terminal node of the network that performs direct communication with the user equipment (or user terminal). In the description of the present invention, particular operations of the present invention that are described as being performed by the base station may also be performed by an upper node of the base station.

More specifically, in a network consisting of multiple network nodes including the base station, diverse operations that are performed in order to communicate with the terminal (or user equipment) may be performed by the base station or network nodes other than the base station. Herein, the term 'Base Station (BS)' may be replaced by other terms, such as fixed station, Node B, eNode B (eNB), ABS (Advanced Base Station), or Access Point (AP). Relay may be replaced by other terms, such as Relay Node (RN), Relay Station (RS), and so on. Furthermore, 'Terminal' may be replaced by other terms, such as UE (User Equipment), MS (Mobile Station), MSS (Mobile Subscriber Station), SS (Subscriber Station), and so on.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (UTRA) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on IEEE 802.11 systems. However, technical features of the present invention are not limited thereto.

With reference to FIG. 1, the structure of a downlink radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1 illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

The above-described radio frame structures are purely exemplary and thus it is to be noted that the number of subframes in a radio frame, the number of slots in a subframe, or the number of symbols in a slot may vary.

Figure 2:
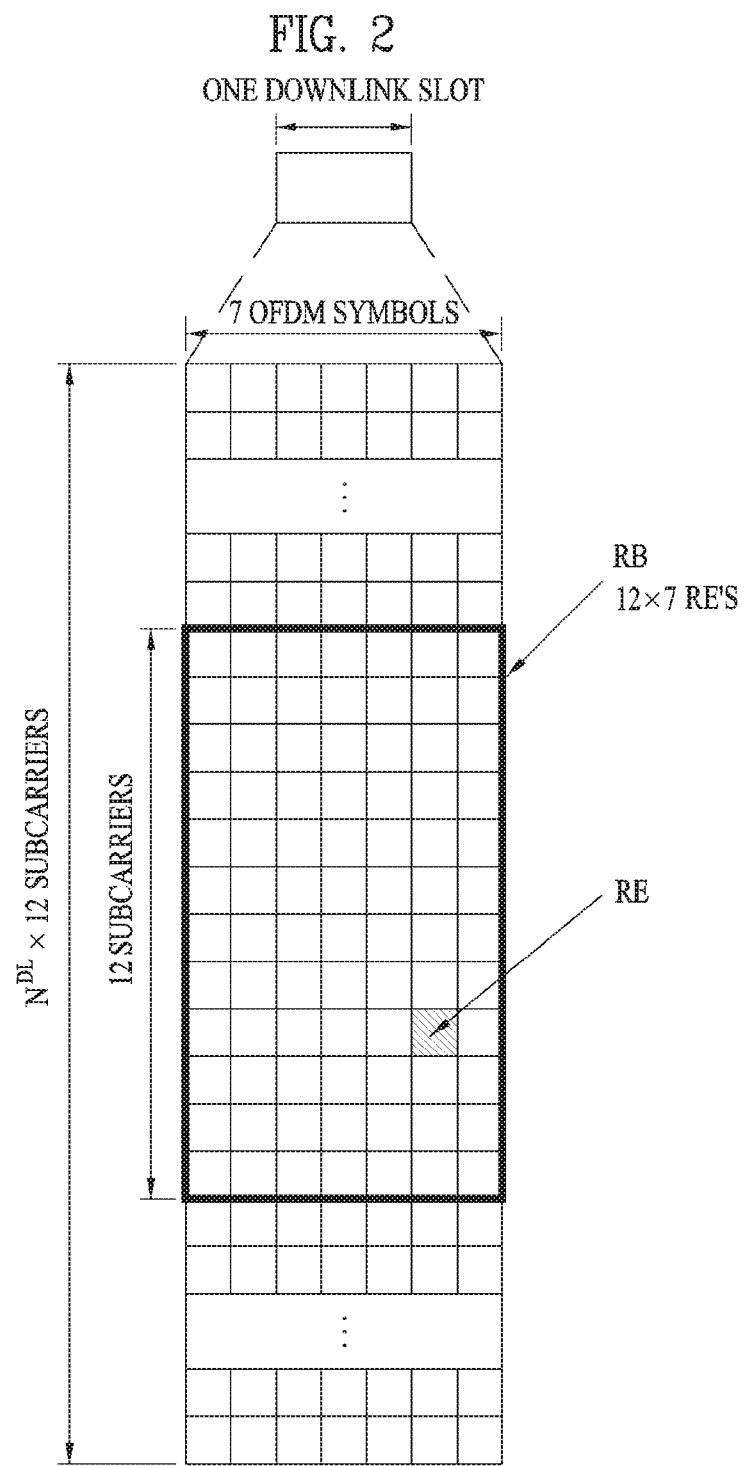
FIG. 2 is a diagram illustrating an example of a resource grid for one downlink slot.

FIG. 2 illustrates the structure of a downlink resource grid for the duration of one downlink slot. FIG. 2 corresponds to a case in which an OFDM includes normal CP. Referring to FIG. 2, a downlink slot includes a plurality of OFDM symbols in the time domain and includes a plurality of RBs in the frequency domain. Here, one downlink slot includes 7 OFDM symbols in the time domain and an RB includes 12 subcarriers in the frequency domain, which does not limit the scope and spirit of the present invention. An element on a resource grid is referred to as a resource element (RE). For example, RE a(k,l) refers to RE location in a kth subcarrier and a first OFDM symbol. In the case of the normal CP, one RB includes 12×7 REs (in the case of the extended CP, one RB includes 12×6 REs). An interval between subcarriers is 15 kHz and thus one RB includes about 180 kHz in the frequency domain. NDL is number of RBs in a downlink slot. NDL depends on a downlink transmission bandwidth configured by BS scheduling.

Figure 3:
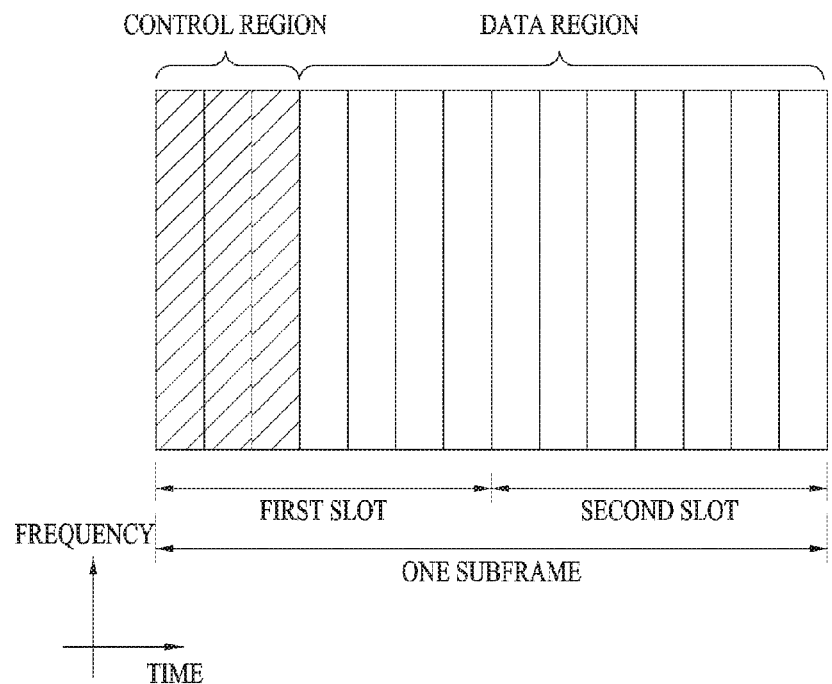
FIG. 3 is a diagram illustrating a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. A basic unit of transmission is one subframe. That is, a PDCCH and a PDSCH are allocated across two slots. Downlink control channels used in the 3GPP LTE system include, for example, a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. When the PDCCH is directed to a specific UE, its CRC may be masked by a cell-RNTI (C-RNTI) of the UE. When the PDCCH is for a paging message, the CRC of the PDCCH may be masked by a paging indicator identifier (P-RNTI). When the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
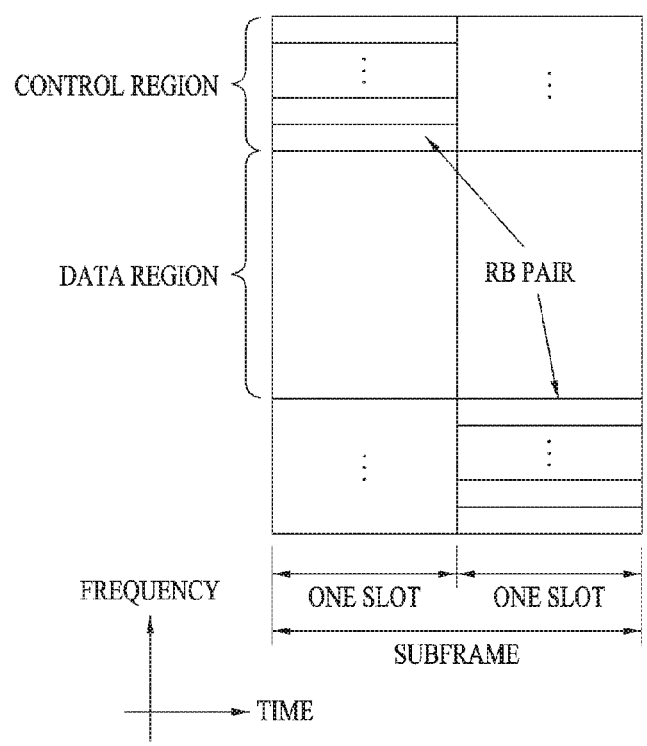
FIG. 4 is a diagram illustrating a structure of an uplink subframe.

FIG. 4 illustrates the structure of an uplink subframe. An uplink subframe may be divided into a control region and a data region in the frequency domain. A Physical Uplink Control Channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Modeling of MIMO system

A multiple input multiple output (MIMO) system increases transmission/reception efficiency of data using multiple transmission (Tx) antennas and multiple reception (Rx) antennas. MIMO technology does not depend upon a single antenna path in order to receive all messages but instead can combine a plurality of data fragments received through a plurality of antennas and receive all data.

MIMO technology includes a spatial diversity scheme, a spatial multiplexing scheme, etc. The spatial diversity scheme can increase transmission reliability or can widen a cell diameter with diversity gain and thus is appropriate for data transmission of a UE that moves a high speed. The spatial multiplexing scheme can simultaneously transmit different data so as to increase data transmission rate without increase in a system bandwidth.

FIG. 5 illustrates the configuration of a MIMO communication system having multiple antennas. As illustrated in FIG. 5(a), the simultaneous use of a plurality of antennas at both the transmitter and the receiver increases a theoretical channel transmission capacity, compared to use of a plurality of antennas at only one of the transmitter and the receiver. Therefore, transmission rate may be increased and frequency efficiency may be remarkably increased. As channel transmission rate is increased, transmission rate may be increased, in theory, to the product of a maximum transmission rate Ro that may be achieved with a single antenna and a transmission rate increase Ri.

$$R_i = \min(N_T, N_R) \qquad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards for 3G mobile communications, future-generation wireless local area network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system will be described in detail through mathematical modeling. It is assumed that NT Tx antennas and NR Rx antennas are present in the system.

Regarding a transmission signal, up to NT pieces of information can be transmitted through the NT Tx antennas, as expressed in Equation 2 below.

$$s = [s_1, s_2, \ldots, s_{N_T}]^T \qquad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

NT transmission signals $x_1, x_2, \ldots, x_{N_T}$ may be generated by multiplying the transmission power-controlled information vectors $\hat{s}$ by a weight matrix W. The weight matrix W functions to appropriately distribute the transmission information to the Tx antennas according to transmission channel states, etc. These NT transmission signals $x_1, x_2, \ldots, x_{N_T}$ are represented as a vector x, which may be determined by Equation 5 below.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

[Equation 5]

Here, $w_{ij}$ refers to a weight between an ith Tx antenna and jth information.

A reception signal x may be considered in different ways according to two cases (e.g., spatial diversity and spatial multiplexing). In the case of spatial multiplexing, different signals are multiplexed and the multiplexed signals are transmitted to a receiver, and thus, elements of information vector (s) have different values. In the case of spatial diversity, the same signal is repeatedly transmitted through a plurality of channel paths and thus elements of information vectors (s) have the same value. A hybrid scheme of spatial multiplexing and spatial diversity can also be considered. That is, that same signal may be transmitted through three Tx antennas and the remaining signals may be spatial-multiplexed and transmitted to a receiver.

In the case of NR Rx antennas, a reception signal of each antenna may be expressed as the vector shown in Equation 6 below.

$$y = [y_1, y_2, \ldots, y_{N_R}]^T \qquad \text{[Equation 6]}$$

When a channel modeling is executed in the MIMO communication system, individual channels can be distinguished from each other according to transmission/reception (Tx/Rx) antenna indexes. A channel passing the range from a Tx antenna j to an Rx antenna i is denoted by hij. It should be noted that the index order of the channel hij is located before a reception (Rx) antenna index and is located after a transmission (Tx) antenna index.

FIG. 5(b) illustrates channels from NT Tx antennas to an Rx antenna i. The channels may be collectively represented in the form of vector and matrix. Referring to FIG. 5(b), the channels passing the range from the NT Tx antennas to the Rx antenna i can be represented by the Equation 7 below.

$$h_i^T = [h_{i1}, h_{i2}, \ldots, h_{iN_T}] \qquad \text{[Equation 7]}$$

All channels passing the range from the NT Tx antennas to NR Rx antennas are denoted by the matrix shown in Equation 8 below.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \qquad \text{[Equation 8]}$$

Additive white Gaussian noise (AWGN) is added to an actual channel which has passed the channel matrix. The AWGN (n1, n2, . . . , nNR) added to each of NR reception (Rx) antennas can be represented by Equation 9 below.

$$n = [n_1, n_2, \ldots, n_{N_R}]^T \qquad \text{[Equation 9]}$$

A reception signal calculated by the above-mentioned equations can be represented by Equation 10 below.

$$y = \begin{bmatrix} y_1 \\ y_2 \\ \vdots \\ y_i \\ \vdots \\ y_{N_R} \end{bmatrix}$$

$$= \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

[Equation 10]

The number of rows and the number of columns of a channel matrix H indicating a channel condition are determined by the number of Tx/Rx antennas. In the channel matrix H, the number of rows is equal to the number (NR) of Rx antennas, and the number of columns is equal to the number (NT) of Tx antennas. Namely, the channel matrix H is denoted by an NR×NT matrix.

The rank of a matrix is defined as the smaller between the number of independent rows and the number of independent columns in the channel matrix. Accordingly, the rank of the channel matrix is not larger than the number of rows or columns of the channel matrix. The rank of a channel matrix H, rank(H) satisfies the following constraint.

$$\text{rank}(H) \leq \min(N_T, N_R) \qquad \text{[Equation 11]}$$

For MIMO transmission, 'rank' indicates the number of paths for independent transmission of signals and 'number of layers' indicates the number of streams transmitted through each path. In general, a transmission end transmits layers, the number of which corresponds to the number of ranks used for signal transmission, and thus, rank have the same meaning as number of layers unless there is no different disclosure.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the reception signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs in a mobile communication system may be divided into two types according to their purposes: RS for channel information acquisition and RS for data demodulation. Since its purpose lies in that a UE acquires downlink channel information, the former should be transmitted in a broad band and received and measured even by a UE that does not receive downlink data in a specific subframe. This RS is also used in a situation like handover. The latter is an RS that an eNB transmits along with downlink data in specific resources. A UE can estimate a channel by receiving the RS and accordingly can demodulate data. The RS should be transmitted in a data transmission area.

A legacy 3GPP LTE (e.g., 3GPP LTE release-8) system defines two types of downlink RSs for unicast services: a common RS (CRS) and a dedicated RS (DRS). The CRS is used for acquisition of information about a channel state, measurement of handover, etc. and may be referred to as a cell-specific RS. The DRS is used for data demodulation and may be referred to as a UE-specific RS. In a legacy 3GPP LTE system, the DRS is used for data demodulation only and the CRS can be used for both purposes of channel information acquisition and data demodulation.

CRSs, which are cell-specific, are transmitted across a wideband in every subframe. According to the number of Tx antennas at an eNB, the eNB may transmit CRSs for up to four antenna ports. For instance, an eNB with two Tx antennas transmits CRSs for antenna port 0 and antenna port 1. If the eNB has four Tx antennas, it transmits CRSs for respective four Tx antenna ports, antenna port 0 to antenna port 3.

Figure 6:
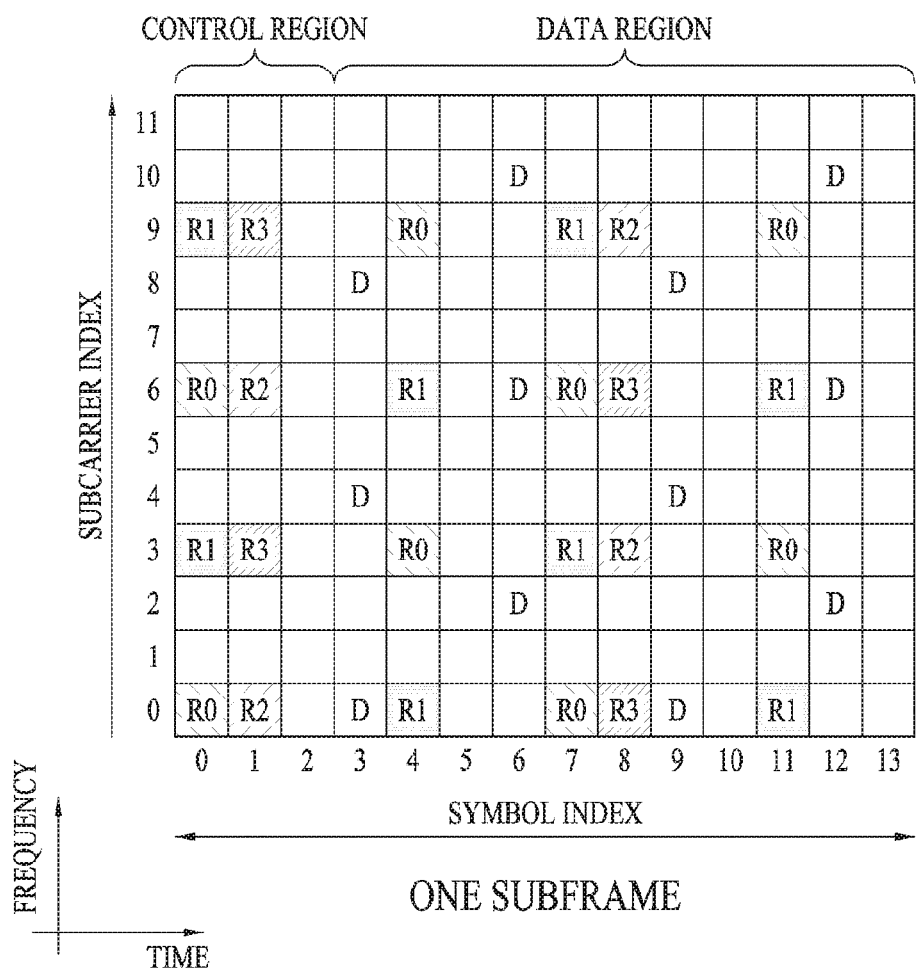
FIG. 6 is a diagram illustrating legacy CRS and DRS patterns.

FIG. 6 illustrates a CRS and DRS pattern for an RB (including 14 OFDM symbols in time by 12 subcarriers in frequency in case of a normal CP) in a system where an eNB has four Tx antennas. In FIG. 6, REs labeled with 'R0', 'R1', 'R2' and 'R3' represent the positions of CRSs for antenna port 0 to antenna port 4, respectively. REs labeled with 'D' represent the positions of DRSs defined in the LTE system.

The LTE-A system, an evolution of the LTE system, can support up to eight Tx antennas. Therefore, it should also support RSs for up to eight Tx antennas. Because downlink RSs are defined only for up to four Tx antennas in the LTE system, RSs should be additionally defined for five to eight Tx antenna ports, when an eNB has five to eight downlink Tx antennas in the LTE-A system. Both RSs for channel measurement and RSs for data demodulation should be considered for up to eight Tx antenna ports.

One of significant considerations for design of the LTE-A system is backward compatibility. Backward compatibility is a feature that guarantees a legacy LTE terminal to operate normally even in the LTE-A system. If RSs for up to eight Tx antenna ports are added to a time-frequency area in which CRSs defined by the LTE standard are transmitted across a total frequency band in every subframe, RS overhead becomes huge. Therefore, new RSs should be designed for up to eight antenna ports in such a manner that RS overhead is reduced.

Largely, new two types of RSs are introduced to the LTE-A system. One type is CSI-RS serving the purpose of channel measurement for selection of a transmission rank, a modulation and coding scheme (MCS), a precoding matrix index (PMI), etc. The other type is demodulation RS (DM RS) for demodulation of data transmitted through up to eight Tx antennas.

Compared to the CRS used for both purposes of measurement such as channel measurement and measurement for handover and data demodulation in the legacy LTE system, the CSI-RS is designed mainly for channel estimation, although it may also be used for measurement for handover. Since CSI-RSs are transmitted only for the purpose of acquisition of channel information, they may not be transmitted in every subframe, unlike CRSs in the legacy LTE system. Accordingly, CSI-RSs may be configured so as to be transmitted intermittently (e.g. periodically) along the time axis, for reduction of CSI-RS overhead.

When data is transmitted in a downlink subframe, DM RSs are also transmitted dedicatedly to a UE for which the data transmission is scheduled. Thus, DM RSs dedicated to a particular UE may be designed such that they are transmitted only in a resource area scheduled for the particular UE, that is, only in a time-frequency area carrying data for the particular UE.

Figure 7:
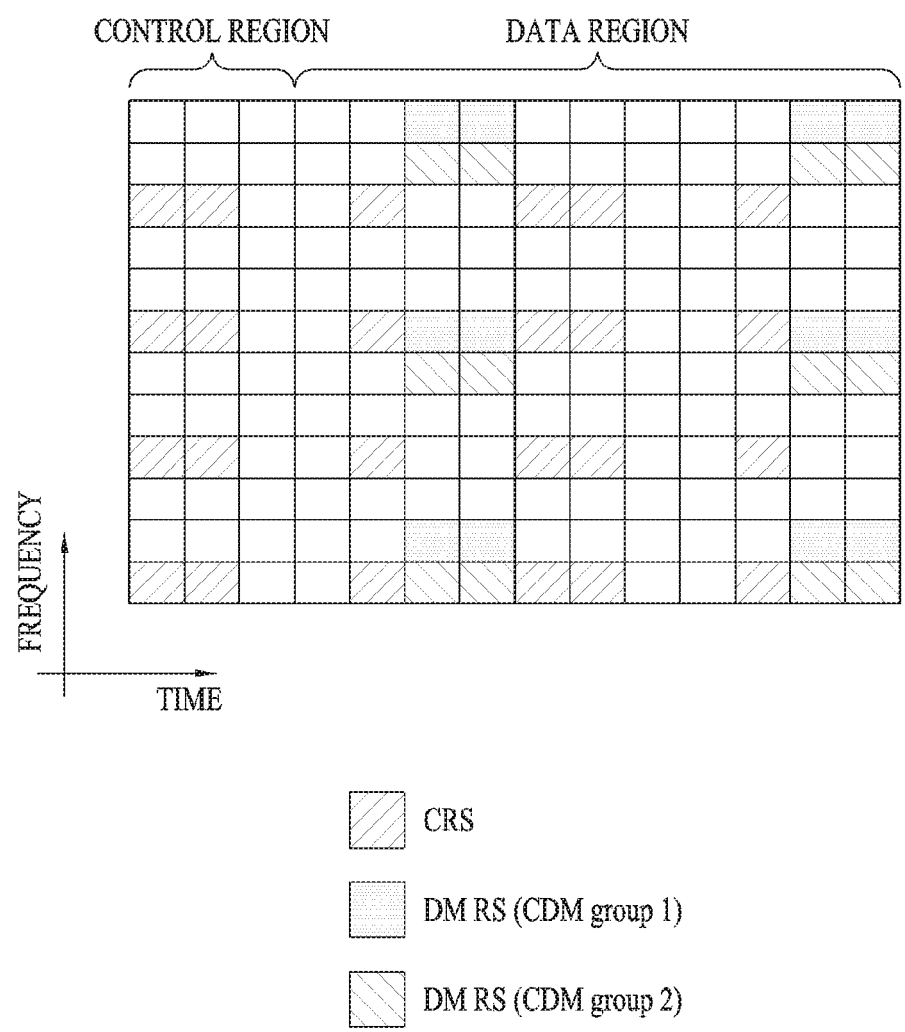
FIG. 7 is a diagram illustrating an example of a DM RS pattern.

FIG. 7 illustrates an exemplary DM RS pattern defined for the LTE-A system. In FIG. 7, the positions of REs carrying DM RSs in an RB carrying downlink data (an RB having 14 OFDM symbols in time by 12 subcarriers in frequency in case of a normal CP) are marked. DM RSs may be transmitted for additionally defined four antenna ports, antenna port 7 to antenna port 10 in the LTE-A system. DM RSs for different antenna ports may be identified by their different frequency resources (subcarriers) and/or different time resources (OFDM symbols). This means that the DM RSs may be multiplexed in frequency division multiplexing (FDM) and/or time division multiplexing (TDM). If DM RSs for different antenna ports are positioned in the same time-frequency resources, they may be identified by their different orthogonal codes. That is, these DM RSs may be multiplexed in Code Division Multiplexing (CDM). In the illustrated case of FIG. 7, DM RSs for antenna port 7 and antenna port 8 may be located on REs of DM RS CDM group 1 through multiplexing based on orthogonal codes. Similarly, DM RSs for antenna port 9 and antenna port 10 may be located on REs of DM RS CDM group 2 through multiplexing based on orthogonal codes.

Figure 8:
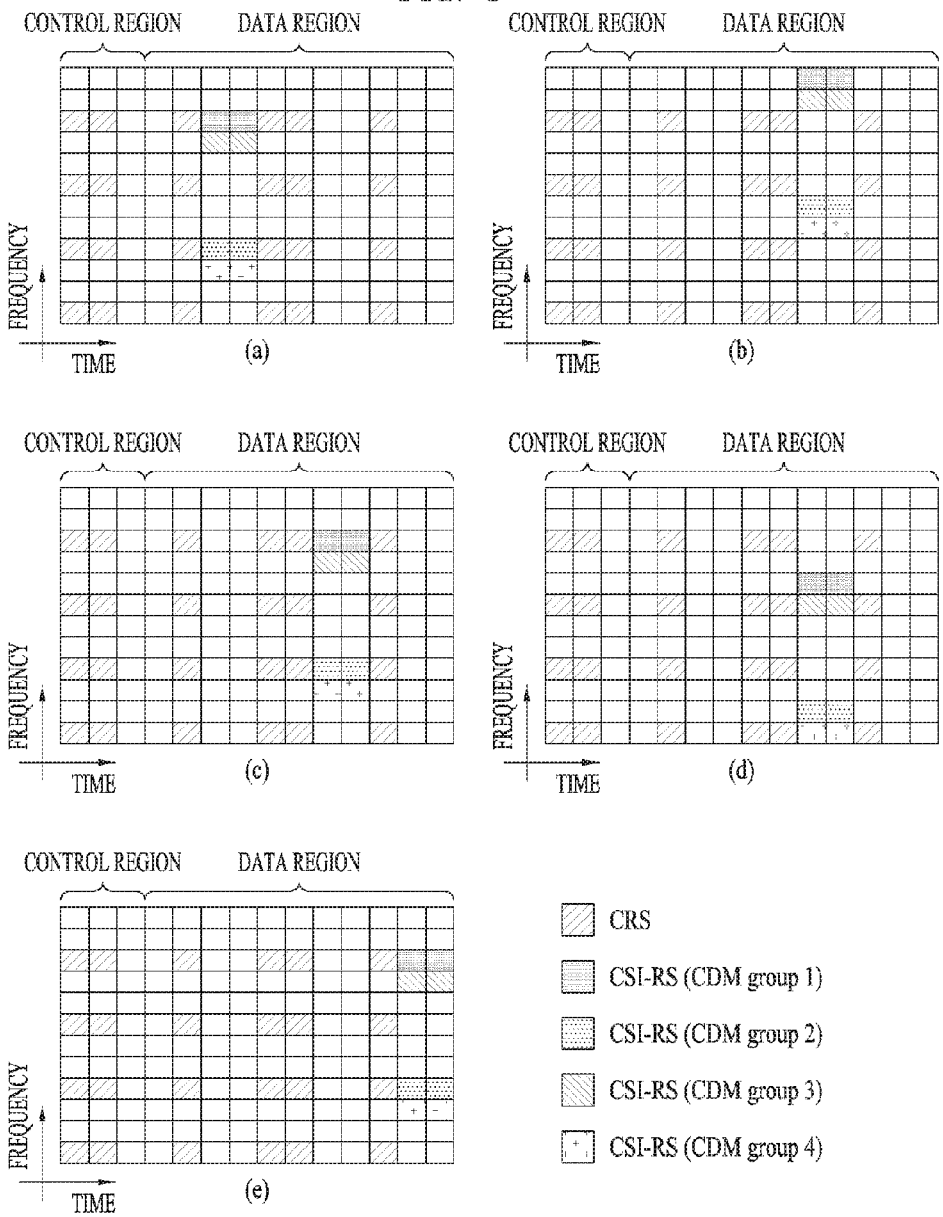
FIG. 8 is a diagram illustrating examples of a CSI-RS pattern.

FIG. 8 illustrates exemplary CSI-RS patterns defined for the LTE-A system. In FIG. 8, the positions of REs carrying CSI-RSs in an RB carrying downlink data (an RB having 14 OFDM symbols in time by 12 subcarriers in frequency in case of a normal CP) are marked. One of the CSI-RS patterns illustrated in FIGS. 8(a) to 8(e) is available for any downlink subframe. CSI-RSs may be transmitted for eight antenna ports supported by the LTE-A system, antenna port 15 to antenna port 22. CSI-RSs for different antenna ports may be identified by their different frequency resources (subcarriers) and/or different time resources (OFDM symbols). This means that the CSI-RSs may be multiplexed in FDM and/or TDM. CSI-RSs positioned in the same time-frequency resources for different antenna ports may be identified by their different orthogonal codes. That is, these DM RSs may be multiplexed in CDM. In the illustrated case of FIG. 8(a), CSI-RSs for antenna port 15 and antenna port 16 may be located on REs of CSI-RS CDM group 1 through multiplexing based on orthogonal codes. CSI-RSs for antenna port 17 and antenna port 18 may be located on REs of CSI-RS CDM group 2 through multiplexing based on orthogonal codes. CSI-RSs for antenna port 19 and antenna port 20 may be located on REs of CSI-RS CDM group 3 through multiplexing based on orthogonal codes. CSI-RSs for antenna port 21 and antenna port 22 may be located on REs of CSI-RS CDM group 4 through multiplexing based on orthogonal codes. The same principle described with reference to FIG. 8(a) is applicable to the CSI-RS patterns illustrated in FIGS. 8(b) to 8(e).

RS patterns shown in FIGS. 6 to 8 are disclosed only for illustrative purposes, and the scope or spirit of the present invention are not limited only to a specific RS pattern. That is, even in the case in which RS patterns different from those of FIGS. 6 to 8 are defined and used, various embodiments of the present invention can also be equally applied thereto without difficulty.

CSI-RS Configuration

Among a plurality of CSI-RSs and a plurality of IMRs set to a UE, one CSI process can be defined in a manner of associating a CSI-RS resource for measuring a signal with an interference measurement resource (IMR) for measuring interference. A UE feedbacks CSI information induced from CSI processes different from each other to a network (e.g., base station) with an independent period and a subframe offset.

In particular, each CSI process has an independent CSI feedback configuration. The base station can inform the UE of the CS-RS resource, the IMR resource association information and the CSI feedback configuration via higher layer signaling. For example, assume that three CSI processes shown in Table 1 are set to the UE.

TABLE 1

| CSI Process | Signal Measurement Resource (SMR) | IMR |
| --- | --- | --- |
| CSI process 0 | CSI-RS 0 | IMR 0 |
| CSI process 1 | CSI-RS 1 | IMR 1 |
| CSI process 2 | CSI-RS 0 | IMR 2 |

In Table 1, a CSI-RS 0 and a CSI-RS 1 indicate a CSI-RS received from a cell 1 corresponding to a serving cell of a UE and a CSI-RS received from a cell 2 corresponding to a neighbor cell participating in cooperation, respectively. IMRs set to each of the CSI processes shown in Table 1 are shown in Table 2.

TABLE 2

| IMR | eNB 1 | eNB 2 |
| --- | --- | --- |
| IMR 0 | Muting | Data transmission |
| IMR 1 | Data transmission | Muting |
| IMR 2 | Muting | Muting |

A cell 1 performs muting in an IMR 0 and a cell 2 performs data transmission in the IMR 0. A UE is configured to measure interference from other cells except the cell 1 in the IMR 0. Similarly, the cell 2 performs muting in an IMR 1 and the cell 1 performs data transmission in the IMR 1. The UE is configured to measure interference from other cells except the cell 2 in the IMR 1. The cell 1 and the cell 2 perform muting in an IMR 2 and the UE is configured to measure interference from other cells except the cell 1 and the cell 2 in the IMR 2.

Hence, as shown in Table 1 and Table 2, if data is received from the cell 1, CSI information of the CSI process 0 indicates optimized RI, PMI and CQI information. If data is received from the cell 2, CSI information of the CSI process 1 indicates optimized RI, PMI and CQI information. If data is received from the cell 1 and there is no interference from the cell 2, CSI information of the CSI process 2 indicates optimized RI, PMI and CQI information.

It is preferable for a plurality of CSI processes set to a UE to share values subordinate to each other. For example, in case of joint transmission performed by the cell 1 and the cell 2, if a CSI process 1 considering a channel of the cell 1 as a signal part and a CSI process 2 considering a channel of the cell 2 as a signal part are set to a UE, it is able to easily perform JT scheduling only when ranks of the CSI process 1 and the CSI process 2 and a selected subband index are identical to each other.

A period or a pattern of transmitting a CSI-RS can be configured by a base station. In order to measure the CSI-RS, a UE should be aware of CSI-RS configuration of each CSI-RS antenna port of a cell to which the UE belongs thereto. The CSI-RS configuration can include a DL subframe index in which the CSI-RS is transmitted, time-frequency location of a CSI-RS resource element (RE) in a transmission subframe (e.g., the CSI-RS patterns shown in FIGS. 8(a) to 8(e)) and a CSI-RS sequence (a sequence used for a CSI-RS usage, the sequence is pseudo-randomly generated according to a prescribed rule based on a slot number, a cell ID, a CP length and the like), etc. In particular, a plurality of CSI-RS configurations can be used by a random (given) base station and the base station can inform a UE(s) in a cell of a CSI-RS configuration to be used for the UE(s).

Since it is necessary to identify a CSI-RS for each antenna port, resources to which the CSI-RS for each antenna port is transmitted should be orthogonal to each other. As mentioned earlier with reference to FIG. 8, the CSI-RS for each antenna port can be multiplexed by the FDM, the TDM and/or the CDM scheme using an orthogonal frequency resource, an orthogonal time resource and/or an orthogonal code resource.

When the base station informs the UEs in a cell of information on a CSI-RS (CSI-RS configuration), it is necessary for the base station to preferentially inform the UEs of information on time-frequency to which the CSI-RS for each antenna port is mapped. Specifically, information on time can include numbers of subframes in which a CSI-RS is transmitted, a period of transmitting a CSI-RS, a subframe offset of transmitting a CSI-RS, an OFDM symbol number in which a CSI-RS resource element (RE) of a specific antenna is transmitted, etc. Information on frequency can include a frequency space of transmitting a CSI-RS resource element (RE) of a specific antenna, an RE offset on a frequency axis, a shift value, etc.

Figure 9:
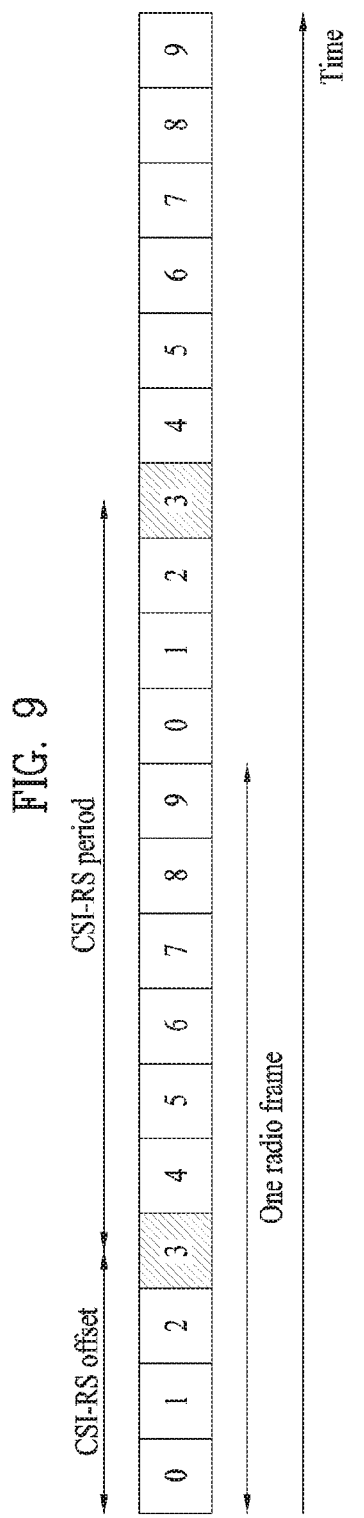
FIG. 9 is a diagram for explaining an example of a scheme of periodically transmitting a CSI-RS.

FIG. 9 is a diagram for explaining an example of a scheme of periodically transmitting a CSI-RS. A CSI-RS can be periodically transmitted with a period of an integer multiple of a subframe (e.g., 5-subframe period, 10-subframe period, 20-subframe period, 40-subframe period or 80-subframe period).

FIG. 9 shows a radio frame configured by 10 subframes (subframe number 0 to 9). In FIG. 9, for example, a transmission period of a CSI-RS of a base station corresponds to 10 ms (i.e., 10 subframes) and a CSI-RS transmission offset corresponds to 3. The offset value may vary depending on a base station to make CSI-RSs of many cells to be evenly distributed in time domain. If a CSI-RS is transmitted with a period of 10 ms, an offset value may have one selected from among 0 to 9. Similarly, if a CSI-RS is transmitted with a period of 5 ms, an offset value may have one selected from among 0 to 4. If a CSI-RS is transmitted with a period of 20 ms, an offset value may have one selected from among 0 to 19. If a CSI-RS is transmitted with a period of 40 ms, an offset value may have one selected from among 0 to 39. If a CSI-RS is transmitted with a period of 80 ms, an offset value may have one selected from among 0 to 79. The offset value corresponds to a value of a subframe in which CSI-RS transmission starts by a base station transmitting a CSI-RS with a prescribed period. If the base station informs a UE of a transmission period of a CSI-RS and an offset value, the UE is able to receive the CSI-RS of the base station at a corresponding subframe position using the transmission period and the offset value. The UE measures a channel through the received CSI-RS and may be then able to report such information as a CQI, a PMI and/or an RI (rank indicator) to the base station. In the present disclosure, the CQI, the PMI and/or the RI can be commonly referred to as CQI (or CSI) except a case of individually explaining the CQI, the PMI and/or the RI. And, the CSI-RS transmission period and the offset can be separately designated according to a CSI-RS configuration.

Figure 10:
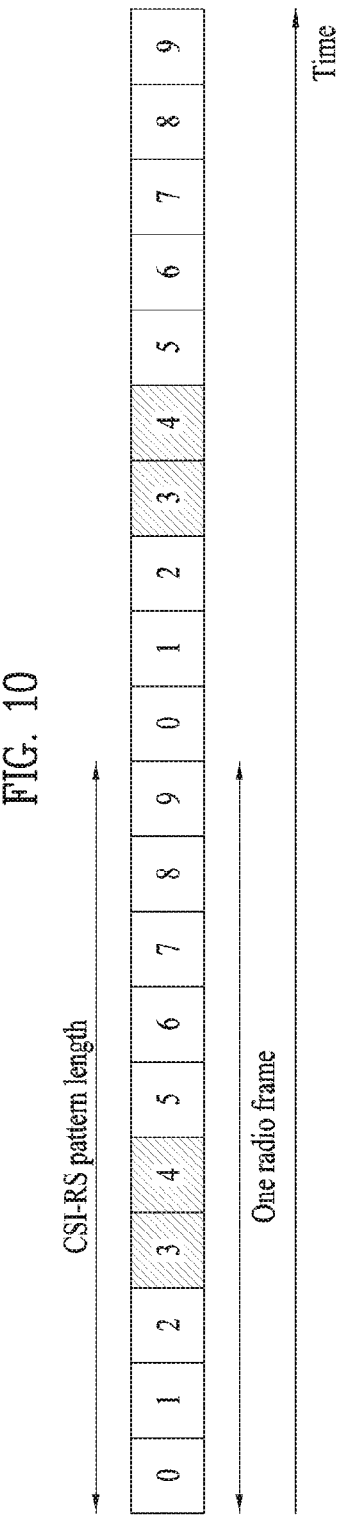
FIG. 10 is a diagram for explaining an example of a scheme of aperiodically transmitting a CSI-RS.

FIG. 10 is a diagram for explaining an example of a scheme of aperiodically transmitting a CSI-RS. In FIG. 10, for example, one radio frame is configured by 10 subframes (subframe number 0 to 9). As shown in FIG. 10, a subframe in which a CSI-RS is transmitted can be represented as a specific pattern. For example, a CSI-RS transmission pattern can be configured by a 10-subframe unit and whether to transmit a CSI-RS can be indicated by a 1-bit indicator in each subframe. An example of FIG. 10 shows a pattern of transmitting a CSI-RS in a subframe index 3 and 4 among 10 subframes (subframe index 0 to 9). The indicator can be provided to a UE via higher layer signaling.

As mentioned in the foregoing description, configuration of CSI-RS transmission can be variously configured. In order to make a UE properly receive a CSI-RS and perform channel measurement, it is necessary for a base station to inform the UE of CSI-RS configuration. Embodiments of the present invention for informing a UE of CSI-RS configuration are explained in the following.

Method of Indicating CSI-RS Configuration

In general, a base station is able to inform a UE of CSI-RS configuration by one of two schemes in the following.

A first scheme is a scheme that a base station broadcasts information on CSI-RS configuration to UEs using dynamic broadcast channel (DBCH) signaling.

In a legacy LTE system, when a base station informs UEs of contents on system information, the information is transmitted to the UEs via a BCH (broadcasting channel). Yet, if the contents are too much and the BCH is unable to carry all of the contents, the base station transmits the system information using a scheme used for transmitting a general downlink data. And, PDCCH CRC of corresponding data is transmitted in a manner of being masked using SI-RNTI, i.e., system information RNTI, instead of a specific UE ID (e.g., C-RNTI). In this case, actual system information is transmitted to a PDSCH region together with a general unicast data. By doing so, all UEs in a cell decode PDCCH using the SI-RNTI, decode PDSCH indicated by the corresponding PDCCH and may be then able to obtain the system information. This type of broadcasting scheme may be referred to as a DBCH (dynamic BCH) to differentiate it from a general broadcasting scheme, i.e., PBCH (physical BCH).

Meanwhile, system information broadcasted in a legacy LTE system can be divided into two types. One is a master information block (MIB) transmitted on the PBCH and another one is a system information block (SIB) transmitted on a PDSCH region in a manner of being multiplexed with a general unicast data. In the legacy LTE system, since informations transmitted with an SIB type 1 to an SIB type 8 (SIB1 to SIB8) are already defined, it may be able to define a new SIB type to transmit information on a CSI-RS configuration corresponding to new system information not defined in the legacy SIB types. For example, it may be able to define SIB9 or SIB10 and the base station can inform UEs within a cell of the information on the CSI-RS configuration via the SIB9 or the SIB10 using a DBCH scheme.

A second scheme is a scheme that a base station informs each UE of information on CSI-RS configuration using RRC (radio resource control) signaling. In particular, the information on the CSI-RS can be provided to each of the UEs within a cell using dedicated RRC signaling. For example, in the course of establishing a connection with the base station via an initial access or handover of a UE, the base station can inform the UE of the CSI-RS configuration via RRC signaling. Or, when the base station transmits an RRC signaling message, which requires channel status feedback based on CSI-RS measurement, to the UE, the base station can inform the UE of the CSI-RS configuration via the RRC signaling message.

Indication of CSI-RS Configuration

A random base station may use a plurality of CSI-RS configurations and the base station can transmit a CSI-RS according to each of a plurality of the CSI-RS configurations to a UE in a predetermined subframe. In this case, the base station informs the UE of a plurality of the CSI-RS configurations and may be able to inform the UE of a CSI-RS to be used for measuring a channel state for making a feedback on a CQI (channel quality information) or CSI (channel state information).

Embodiments for a base station to indicate a CSI-RS configuration to be used in a UE and a CSI-RS to be used for measuring a channel are explained in the following.

Figure 11:
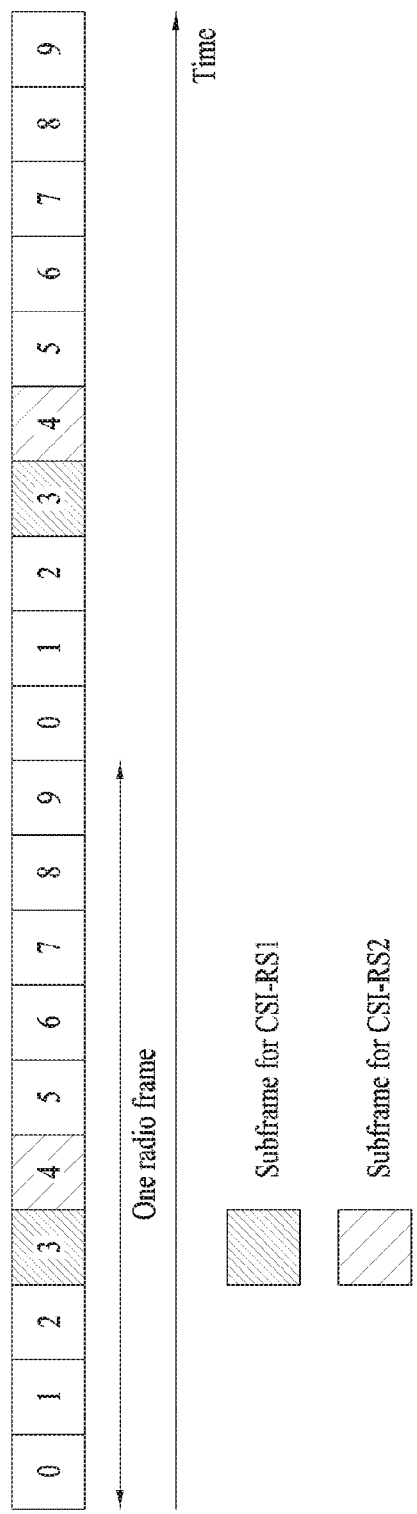
FIG. 11 is a diagram for explaining an example of using two CSI-RS configurations.

FIG. 11 is a diagram for explaining an example of using two CSI-RS configurations. In FIG. 11, for example, one radio frame is configured by 10 subframes (subframe number 0 to 9). In FIG. 11, in case of a first CSI-RS configuration, i.e., a CSI-RS 1, a transmission period of a CSI-RS is 10 ms and a transmission offset of a CSI-RS is 3. In FIG. 11, in case of a second CSI-RS configuration, i.e., a CSI-RS2, a transmission period of a CSI-RS is 10 ms and a transmission offset of a CSI-RS is 4. A base station informs a UE of information on two CSI-RS configurations and may be able to inform the UE of a CSI-RS configuration to be used for CQI (or CSI) feedback among the two CSI-RS configurations.

If the base station asks the UE to make a CQI feedback on a specific CSI-RS configuration, the UE can perform channel state measurement using a CSI-RS belonging to the CSI-RS configuration only. Specifically, a channel state is determined based on CSI-RS reception quality, an amount of noise/interference and a function of a correlation coefficient. In this case, the CSI-RS reception quality is measured using the CSI-RS belonging to the CSI-RS configuration only. In order to measure the amount of noise/interference and the correlation coefficient (e.g., an interference covariance matrix indicating interference direction, etc.), measurement can be performed in a subframe in which the CSI-RS is transmitted or a subframe designated in advance. For example, in the embodiment of FIG. 11, if the base station asks the UE to make a feedback on the first CSI-RS configuration (CSI-RS1), the UE measures reception quality using a CSI-RS transmitted in a fourth subframe (a subframe index 3) of a radio frame and the UE can be separately designated to use an add number subframe to measure the amount of noise/interference and the correlation coefficient. Or, it is able to designate the UE to measure the CSI-RS reception quality, the amount of noise/interference and the correlation coefficient in a specific single subframe (e.g., a subframe index 3) only.

For example, reception signal quality measured using a CSI-RS can be simply represented by SINR (signal-to-interference plus noise ratio) as S/(I+N) (in this case, S corresponds to strength of a reception signal, I corresponds to an amount of interference and N corresponds to an amount of noise). The S can be measured through a CSI-RS in a subframe including the CSI-RS in a subframe including a signal transmitted to a UE. Since the I and the N change according to an amount of interference received from a neighbor cell, direction of a signal received from a neighbor cell, and the like, the I and the N can be measured by a CRS transmitted in a subframe in which the S is measured or a separately designated subframe, etc.

In this case, the amount of noise/interference and the correlation coefficient can be measured in a resource element (RE) in which a CRS belonging to a corresponding subframe or a CSI-RS is transmitted. Or, in order to easily measure noise/interference, the noise/interference can be measured through a configured null RE. In order to measure noise/interference in a CRS or CSI-RS RE, a UE preferentially recovers a CRS or a CSI-RS and subtracts a result of the recovery from a reception signal to make a noise and interference signal to be remained only. By doing so, the UE is able to obtain statistics of noise/interference from the remained noise and the interference signal. A null RE may correspond to an empty RE (i.e., transmission power is 0 (zero)) in which no signal is transmitted by a base station. The null RE makes other base stations except the corresponding base station easily measure a signal. In order to measure an amount of noise/interference, it may use all of a CRS RE, a CSI-RS RE and a null RE. Or, a base station may designate REs to be used for measuring noise/interference for a UE. This is because it is necessary to properly designate an RE to be used for measuring noise/interference measured by the UE according to whether a signal of a neighbor cell transmitted to the RE corresponds to a data signal or a control signal. Since the signal of the neighbor cell transmitted to the RE varies according to whether or not synchronization between cells is matched, a CRS configuration, a CSI-RS configuration and the like, the base station identifies the signal of the neighbor cell and may be able to designate an RE in which measurement is to be performed for the UE. In particular, the base station can designate the UE to measure noise/interference using all or a part of the CRS RE, the CSI-RS RE and the null RE.

For example, the base station may use a plurality of CSI-RS configurations and may be able to inform the UE of a CSI-RS configuration to be used for CQI feedback and a null RE position while informing the UE of one or more CSI-RS configurations. In order to distinguish the CSI-RS configuration to be used for CQI feedback by the UE from a null RE transmitted by zero transmission power, the CSI-RS configuration to be used for CQI feedback by the UE may correspond to a CSI-RS configuration transmitted by non-zero transmission power. For example, if the base station informs the UE of a CSI-RS configuration in which the UE performs channel measurement, the UE can assume that a CSI-RS is transmitted by non-zero transmission power in the CSI-RS configuration. In addition, if the base station informs the UE of a CSI-RS configuration transmitted by zero transmission power (i.e., null RE position), the UE can assume that an RE position of the CSI-RS configuration corresponds to zero transmission power. In other word, when the base station informs the UE of a CSI-RS configuration of non-zero transmission power, if there exists a CSI-RS configuration of zero transmission power, the base station can inform the UE of a corresponding null RE position.

As a modified example of the method of indicating a CSI-RS configuration, the base station informs the UE of a plurality of CSI-RS configurations and may be able to inform the UE of all or a part of CSI-RS configurations to be used for CQI feedback among a plurality of the CSI-RS configurations. Hence, having received a request for CQI feedback on a plurality of the CSI-RS configurations, the UE measures a CQI using a CSI-RS corresponding to each CSI-RS configuration and may be then able to transmit a plurality of CQI information to the base station.

Or, in order to make the UE transmit a CQI for each of a plurality of the CSI-RS configurations, the base station can designate an uplink resource, which is necessary for the UE to transmit the CQI, in advance according to each CSI-RS configuration. Information on the uplink resource designation can be provided to the UE in advance via RRC signaling.

Or, the base station can dynamically trigger the UE to transmit a CQI for each of a plurality of CSI-RS configurations to the base station. Dynamic triggering of CQI transmission can be performed via PDCCH. It may inform the UE of a CSI-RS configuration for which a CQI is to be measured via PDCCH. Having received the PDCCH, the UE can feedback a CQI measurement result measured for the CSI-RS configuration designated by the PDCCH to the base station.

A transmission timing of a CSI-RS corresponding to each of a plurality of the CSI-RS configurations can be designated to be transmitted in a different subframe or an identical subframe. If CSI-RSs according to CSI-RS configurations different from each other are designated to be transmitted in an identical subframe, it may be necessary to distinguish the CSI-RSs from each other. In order to distinguish the CSI-RSs according to the CSI-RS configurations different from each other, it may be able to differently apply at least one selected from the group consisting of a time resource, a frequency resource and a code resource of CSI-RS transmission. For example, an RE position in which a CSI-RS is transmitted can be differently designated in a subframe according to a CSI-RS configuration (e.g., a CSI-RS according to one CSI-RS configuration is designated to be transmitted in an RE position shown in FIG. 8 (*a*) and a CSI-RS according to another CSI-RS configuration is designated to be transmitted in an RE position shown in FIG. 8 (*b*)) (distinction using a time and frequency resource). Or, if CSI-RSs according to CSI-RS configurations different from each other are transmitted in an identical RE position, the CSI-RSs can be distinguished from each other by differently using a CSI-RS scrambling code in the CSI-RS configurations different from each other (distinction using a code resource).

Quasi Co-Located (QC)

A UE can receive data from a plurality of transmission points (TPs) (e.g., a TP1 and a TP2). Hence, the UE is able to transmit channel state information on a plurality of the TPs. In this case, RSs can also be transmitted to the UE from a plurality of the TPs. In this case, if it is able to share properties for channel estimation from RS ports different from each other of TPs different from each other, it may be able to reduce load and complexity of reception processing of the UE. Moreover, if it is able to share properties for channel estimation from RS ports different from each other of an identical TP between the RS ports, it may be able to reduce load and complexity of reception processing of the UE. Hence, LTE-A system proposes a method of sharing properties for channel estimation between RS ports.

For channel estimation between RS ports, LTE-A system has introduced such a concept as "quasi co-located (QLC)". For example, if two antenna ports are quasi co-located (QC), the UE may assume that large-scale properties of the signal received from the first antenna port can be inferred from the signal received from the other antenna port". In this case, the large-scale properties can include at least one selected from the group consisting of delay spread, Doppler spread, Doppler shift, average gain and average delay. In the following, the quasi co-located is simply referred to as QCL.

In particular, if two antenna ports are QCL, it may indicate that large-scale properties of a radio channel received from one antenna port are identical to large-scale properties of a radio channel received from another antenna port. If antenna ports transmitting RSs different from each other are QCL, large-scale properties of a radio channel received from one antenna port of a type can be replaced with large-scale properties of a radio channel received from one antenna port of a different type.

According to the aforementioned QCL concept, a UE is unable to assume large-scale channel properties identical to each other between radio channels received from non-QCL (NQC) antenna ports. In particular, in this case, a UE should perform an independent processing according to each configured non-QCL antenna port to obtain timing acquisition and tracking, frequency offset estimation and compensation, delay estimation, and Doppler estimation and the like.

A UE can perform operations in the following between antenna ports capable of assuming QCL. First of all, the UE can use delay spread, Doppler spectrum, Doppler spread estimation result for a radio channel received from an antenna port when a channel is estimated for a radio channel received from a different antenna port. Secondly, regarding frequency shift and received timing, after time synchronization and frequency synchronization for a single antenna port are performed, the UE can apply identical synchronization to demodulation of a different antenna port. Thirdly, regarding average received power, the UE can average RSRP (reference signal received power) measurements for over two or more antenna ports.

If a UE receives a DMRS-based DL-related DCI format via a control channel (PDCCH or EPDCCH), the UE performs channel estimation for a corresponding PDSCH via a DM-RS sequence and performs data demodulation. If DMRS port configuration received from a DL scheduling grant is capable of being QCL with a CRS port, the UE can apply the large-scale channel properties estimation estimated from the CRS port as it is in case of estimating a channel via the DMRS port. This is because a CRS corresponds to a reference signal broadcasted in every subframe with relatively high density over a whole band, the estimation on the large-scale channel properties can be more stably obtained from the CRS. On the contrary, since a DMRS is UE-specifically transmitted for a specific scheduled RB and a precoding matrix, which is used by a base station for transmission, may vary according to a PRG unit, an effective channel received by the UE may vary according to the PRG unit. Hence, if a DMRS is used for estimating the large-scale channel properties of a radio channel over a wide band, performance degradation may occur. In case of a CSI-RS, since the CSI-RS has a relatively long transmission period and a relatively low density, if the CSI-RS is used for estimating the large-scale channel properties of the radio channel, performance degradation may occur.

That is, QCL assumption between antenna ports can be utilized for receiving various DL reference signals, estimating a channel, reporting a channel state and the like.

Method for Removing Interference According to the Present Invention

The present invention relates to an interference cancellation scheme (ICS), that is, network assisted interference cancellation and suppression (NAICS), which may detect and remove a neighbor cell interference signal in accordance with assistance from a network in a multi-cell environment wireless communication system in which a plurality of cells (e.g., eNB or TP) exist. In more detail, the present invention relates to a CSI feedback method of a UE when NAICS is performed based on information of a neighbor cell interference signal provided from a network to the UE or acquired through a method such as blind detection (BD).

Figure 12:
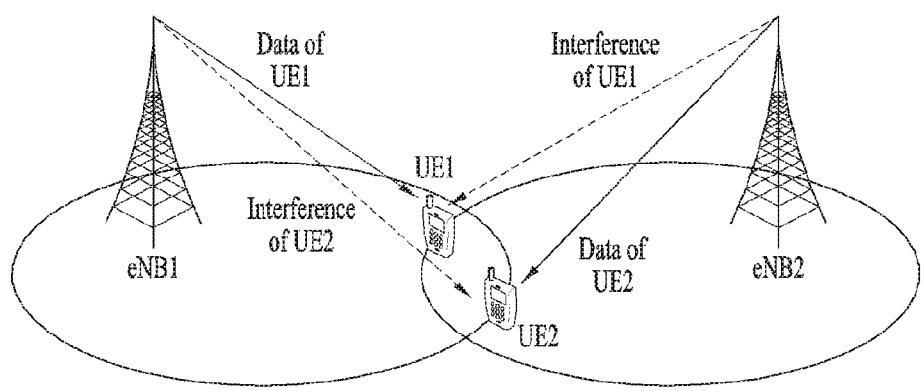
FIG. 12 is a diagram illustrating an interference environment that data from eNB1 to UE1 interfere with UE2 and at the same time data from eNB2 to UE2 interfere with UE1.

The network assisted interference cancellation and suppression (NAICS) scheme considered in an advanced wireless communication system such as LTE Rel-12 means a scheme in which a UE cancels interference from a neighbor cell on the basis of assistance from a network. FIG. 12 illustrates an interference environment that data from eNB1 to UE1 interfere with UE2 and at the same time data from eNB2 to UE2 interfere with UE1 when the UE1 served from the eNB1 and the UE2 served from the eNB2 exist in the LTE system. That is, in FIG. 12, for the UE1, the eNB1 becomes a serving cell and the eNB2 becomes an interference cell. In FIG. 12, the UE1 may suppress interference influence by successfully removing interference data, which are transmitted from the eNB, from a received signal after demodulating or decoding the interference data when performing the NAICS scheme. Hereinafter, for convenience of description, the UE which performs NAICS will be referred to as "NAICS UE".

The UE may receive interference information (IP, interference parameters) from the network or discover interference information by itself through BD to perform the NAICS scheme.

The following Table 3 is an example of interference information (IP, interference parameters).

TABLE 3

| | Parameters |
|---|---|
| Independently from the TM used in the Interfering cell. | CFI<br>MBSFN configuration<br>RI<br>CRS AP<br>Cell ID<br>Modulation Order<br>MCS<br>RNTI<br>TM |
| If CRS TMs are used in Interfering cell | PMI<br>Data to RS EPRE, PA, PB<br>System bandwidth<br>PDSCH allocation |
| If DM-RS TMs are used in Interfering cell | PDSCH bandwidth for DM-RS<br>Data to RS EPRE, PB<br>DMRS APs<br>nSCID<br>CSI-RS presence and their pattern<br>Virtual cell ID |

Figure 13:
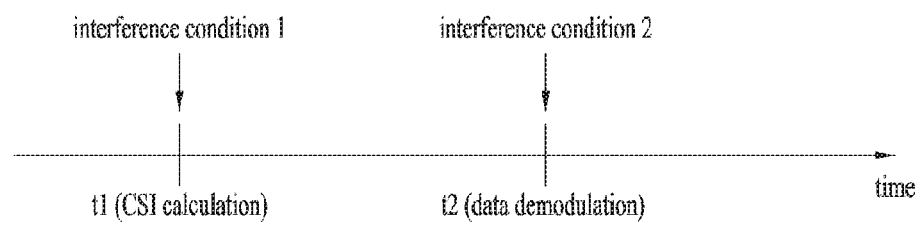
FIG. 13 is a diagram illustrating an example of an interference relation between UEs of a serving cell and UEs of an interference cell.

FIG. 13 illustrates an interference condition change of a CSI calculation time and a data demodulation time of a UE.

Referring to FIG. 13, t1 means the time when CSI is calculated, and t2 means the time when data demodulation is performed. Interference conditions 1 and 2 indicate interference conditions at the respective timing points of t1 and t2. The interference conditions are determined by the interference information of Table 3 and finally determined as a result of data scheduling of the interference cell. For example, if a modulation order used by the interference cell for data transmission to a specific RB is changed at the timing points t1 and t2, the interference conditions 1 and 2 are not the same as each other.

IC performance of the NAICS UE is vulnerable to such interference conditions. For example, if the modulation order of interference is QPSK, the NAICS UE may perform IC at relatively high accuracy. However, if the modulation order of interference is changed to 64 QAM, the NAICS UE performs IC at relatively low accuracy. This is because that one of 4 constellation points is detected as an interference signal in case of QPSK but one of 64 constellation points should be detected as an interference signal in case of 64 QAM to lower the probability of accurately detecting the interference signal. Although IC performance change based on the modulation order of interference has been described as an example, this feature occurs similarly in accordance with various kinds of interference information such as the number of layers of interference and TM.

Since IC performance of the NAICS UE is vulnerable to the interference conditions as above, there is a difference between CQI when IC is performed assuming the interference condition 1 and CQI when IC is performed assuming the interference condition 2. However, if eNB receives a feedback value of CQI calculated assuming the interference condition 1 at the time t1, configures an MCS based on the feedback value and then transmits data at the time t2, the difference between CQIs is disregarded. As a result, MCS mismatch occurs, whereby a problem occurs in that NAICS gain is not obtained sufficiently.

To solve this problem, it is suggested that the UE should perform advanced CSI feedback like the following embodiment.

The UE may feed CSI of the following embodiment back, and the eNB may configure a data MCS by recalculating or selecting CQI suitable for the interference condition 2. To this end, the eNB should in advance know interference information of the interference cell through a backhaul at the time t2.

First Embodiment

The first embodiment of the present invention relates to generic CSI feedback.

That is, the UE reports generic CQI to allow the eNB to recalculate CQI suitable for a random interference condition. For example, the generic CQI may be defined as follows.

$$CQI1 = Q(Ps/Noc) \quad \text{[Equation 12]}$$

$$CQI2 = Q(PI/Noc) \quad \text{[Equation 13]}$$

In the above Equations, Q means a quantization function, and Noc, PI, and Ps respectively mean a power of the other signals except a signal of an interference cell (targeted on IC) and a signal of a serving cell, an interference power from the interference cell, and a desired signal power from the serving cell.

The eNB notifies the UE of an IMR for Noc measurement and a CSI-RS for Ps measurement by configuring a CSI process to allow the UE to calculate CQI1. Additionally, the eNB notifies the UE of an interference CSI-RS or interference CRS for PI measurement through the CSI process configuration.

Alternatively, the eNB may configure the interference CSI-RS through a scheduled manner instead of directly notifying the UE of the interference CSI-RS. For example, if the eNB and the UE know the same RSRP set for a neighbor cell, a CSI-RS or CRS of a neighbor cell having the greatest RSRP among neighbor cells where traffic exists in a CSI reference resource may be scheduled as the interference CSI-RS for PI measurement.

If an RRH TP where several independent CSI-RSs exist is deployed within a cell (e.g., CoMP scenario 4), the UE selects a neighbor cell based on the RSRP as above and then selects the interference CSI-RS for PI measurement based on the received power of each CSI-RS transmitted from the selected neighbor cell. For example, the UE selects the CSI-RS having the greatest received power as the interference CSI-RS for PI measurement. The UE reports the selected interference CSI-RS to the eNB to allow the eNB to identify a TP that transmits the interference CSI-RS, and performs CQI recalculation suitable for the interference condition 2 of the corresponding TP.

The eNB may recalculate the CQI suitable for the interference condition 2 through the following operation by receiving the CQI1 and the CQI2.

$$CQI1/(1+alpha*CQI2) \quad \text{[Equation 14]}$$

In the above Equation, alpha is a value for determining a residual interference power after IC. If alpha is 1, it indicates the same effect as that IC is not performed, and if alpha is close to 0, it means that interference is perfectly canceled. This alpha is determined in accordance with the interference condition and UE geometry, especially determined by SNR, INR, interference modulation order, the number of interference layers, etc. The eNB may respectively obtain SNR and INR from CQI 1 and CQI 2, and may identify the other factors, interference modulation order and the number of interference layers, through interference information sharing between eNBs.

The UE uses PUSCH resources at a feedback offset and cycle set in the CSI process to report the CQI1 and the CQI2. To additionally feed the CQI2 back unlike the legacy CQI feedback, the following embodiment is suggested.

1-1th Embodiment

The 1-1th embodiment is to additionally feed CQI2 according to the first embodiment back.

In the legacy system, if the UE transmits rank 2 or more, the UE transmits CQI for each of codewords at one subframe, whereby a total of two CQIs may be transmitted at one time. That is, when CQI for codeword 1 and CQI for codeword 2 exist, the UE transmits CQI for codeword 1 by performing quantization of 4 bits and transmits CQI for codeword 2 by performing quantization of 3 bits for a difference from CQI for codeword 1 to reduce payload.

If the NAICS UE is rank 1, considering PUCCH CSI feedback management of the legacy system, CQI 2 may be fed back in the same manner as CQI for codeword 2 when the generic CSI is fed back. That is, if the UE is rank 1, in accordance with the legacy PUCCH format 2/2a/2b, the UE transmits CQI1 by performing quantization of 4 bits and at the same time reports CQI2 by performing quantization of 3 bits for a difference from CQI1.

This method is not applied to the case where the NAICS UE is rank 2. However, since the UE which performs NAICS is generally located at the cell edge having great interference, there is a little the probability of rank 2. Therefore, even though the generic CSI feedback limited to rank 1 is performed, sufficient NAICS gain may be obtained.

1-2th Embodiment

The 1-2th embodiment relates to a method for enabling or disabling a generic CSI feedback according to the first embodiment.

For example, the eNB may enable or disable the generic CSI feedback suggested as above through RRC signaling. The eNB enables the above feedback if it is determined that the UE receives strong interference at the cell edge based on the RSRP.

Although this signaling may newly be defined, the legacy RRC signaling may be used. For example, if the eNB configures rank 1 restriction to the UE by using codebook subset restriction, the UE may construe the rank 1 restriction as enabling of the generic CSI feedback.

Meanwhile, the generic CSI feedback is performed periodically through PUCCH resource configured in single CSI process, whereby the PUCCH resource may be saved. However, the suggestion of the present invention may be applied to even the case where a plurality of CSI processes are used, and PUSCH resource as well as PUCCH resource may be used, and aperiodic feedback may be used.

Second Embodiment

The second embodiment of the present invention relates to interference hypothesis of CSI feedback.

For example, the UE feeds the interference condition 1 at the time t1 back together with CQI. The eNB compares the interference condition 2 which is scheduling information of the interference cell with the condition 1 reported by the UE at the time t2 and uses the compared result for MCS determination.

For example, the eNB performs scheduling by determining CQI calculated under the interference condition exactly matched with the interference condition 2 as available CQI. If NAICS UE 1 and NAICS UE 2 perform contention based data transmission at the time t2, the eNB performs scheduling for the UE matched with the interference condition 2 through comparison of interference hypotheses reported by the two UEs.

For another example, the eNB appropriately compensates for CQI by comparing the reported interference condition with the interference condition 2 if there is no CQI calculated under the interference condition exactly matched with the interference condition 2. This compensation may be applied to outer loop link adaptation (OLLA), whereby the compensation may be used to control a step size of OLLA.

The interference hypothesis fed back from the UE together with CQI may be one of interference hypotheses in advance scheduled between the eNB and the UE. For example, as illustrated in Table 4, the interference hypothesis may be scheduled by the eNB and the UE, and the UE may feed the interference condition assumed by CQI calculation back to the eNB.

For example, if feedback bits of 3 bits are used, interference hypothesis may be allocated to each bit as illustrated in Table 5, whereby information on the interference hypothesis may be transmitted.

TABLE 4

| Interference hypothesis | RI | Modulation order |
| --- | --- | --- |
| 0 | Rank 1 | QPSK |
| 1 | Rank 1 | 16QAM |
| 2 | Rank 1 | 64QAM |
| 3 | Rank 2 | QPSK |
| 4 | Rank 2 | 16QAM |
| 5 | Rank 2 | 64QAM |

TABLE 5

| Feedback bits | Interference hypothesis |
| --- | --- |
| 000 | Interference hypothesis 0 |
| 001 | Interference hypothesis 1 |
| 010 | Interference hypothesis 2 |
| 011 | Interference hypothesis 3 |
| 100 | Interference hypothesis 4 |
| 101 | Interference hypothesis 5 |
| 110 | Reserved |
| 111 | Reserved |

The interference hypothesis may be defined statically, or may be RRC-configured semi-statically, whereby the eNB may deliver the interference hypothesis to the UE.

Figure 14:
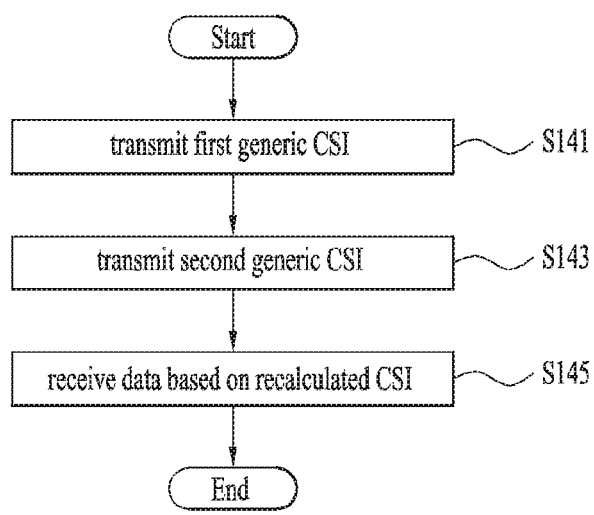
FIG. 14 is a diagram illustrating a method for receiving data in accordance with one embodiment of the present invention.

FIG. 14 is a diagram illustrating a method for receiving data in accordance with one embodiment of the present invention.

At step S141, the UE transmits first generic CSI generated based on a desired signal power from the serving cell. The first generic CSI may be determined as expressed by the Equation 12, and since the first generic CSI is the same as that described in the first embodiment, its description will be omitted.

Next, the UE transmits second generic CSI generated based on an interference signal power from the interference cell (S143). The second generic CSI may be determined as expressed by the Equation 13, and since the second generic CSI is the same as that described in the first embodiment, its description will be omitted.

Afterwards, the UE receives data based on CSI recalculated using the interference condition changed after the first and second generic CSIs are received (S145). The recalculated CSI may be determined as expressed by the Equation 14, and since the recalculated CSI is the same as that described in the first embodiment, its description will be omitted.

Figure 15:
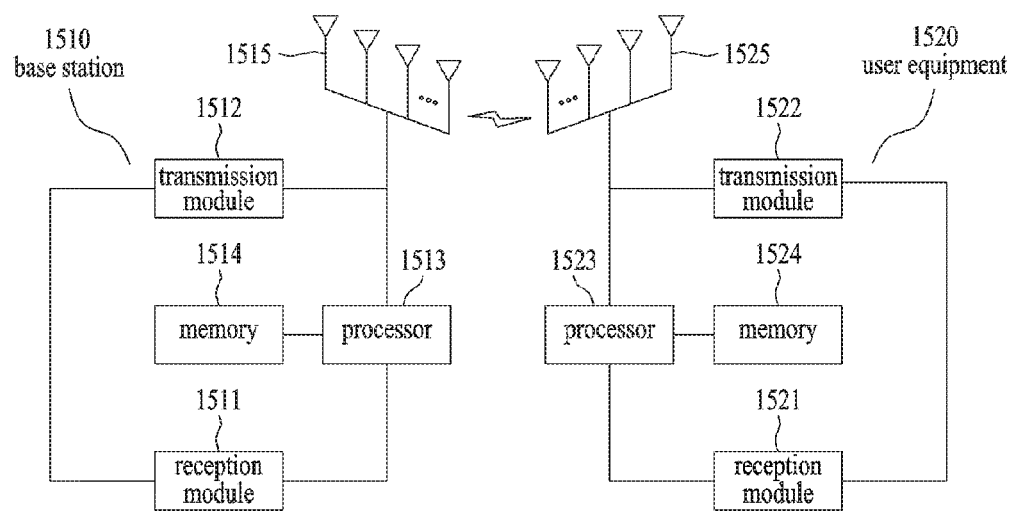
FIG. 15 is a diagram illustrating eNB and UE that may be applied to one embodiment of the present invention.

FIG. 15 is a diagram illustrating eNB and UE that may be applied to one embodiment of the present invention.

If a relay is included in a wireless communication system, communication in a backhaul link is performed between the eNB and the relay and communication in an access link is performed between the relay and the UE. Therefore, the eNB or the UE as shown may be replaced with the relay depending on the circumstances.

Referring to FIG. 15, the wireless communication system includes an eNB 1510 and a UE 1520. The eNB 1510 includes a processor 1513, a memory 1514, and radio frequency (RF) units 1511 and 1512. The processor 1513 may be configured to implement procedures and/or methods suggested in the present invention. The memory 1414 is connected with the processor 1513 and stores various kinds of information related to the operation of the processor 1513. The RF unit 1516 is connected with the processor 1513 and transmits and/or receives a radio signal. The UE 1520 includes a processor 1523, a memory 1524, and radio frequency (RF) units 1521 and 1522. The processor 1523 may be configured to implement procedures and/or methods suggested in the present invention. The memory 1524 is connected with the processor 1523 and stores various kinds of information related to the operation of the processor 1523. The RF units 1521 and 1522 are connected with the processor 1523 and transmits and/or receives a radio signal. The eNB 1510 and/or the UE 1520 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

In this specification, a specific operation which has been described as being performed by the eNB may be performed by an upper node of the eNB as the case may be. In other words, it will be apparent that various operations performed for communication with the UE in the network which includes a plurality of network nodes including the eNB may be performed by the eNB or network nodes other than the eNB. The eNB may be replaced with terminologies such as a fixed station, Node B, eNode B (eNB), and an access point (AP).

The embodiments according to the present invention may be implemented by various means, for example, hardware, firmware, software, or their combination. If the embodiments according to the present invention are implemented by hardware, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

The preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The present invention may be used for wireless communication systems such as UE, relay, and eNB.

What is claimed is:
1. A method for removing interference and receiving data in a wireless communication system, the method performed by a UE and comprising:
   transmitting first generic channel state information (CSI) to a serving cell, the first generic CSI generated at a first time based on a desired signal power from the serving cell;
   transmitting second generic CSI to an interference cell, the second generic CSI generated at the first time based on an interference signal power from the interference cell;
   receiving data from the serving cell at a second time, the data subject to an interference condition changed after the first generic CSI and the second generic CSI are transmitted; and
   performing data demodulation of the received data at the second time,
      wherein the received data is based on the transmitted first generic CSI and the second generic CSI,
   wherein the first generic CSI is determined according to:

$$CQI1 = Q(Ps/Noc),$$

wherein CQI 1 is the first CSI,
   wherein Q is a quantization function,
   wherein Noc is a power of signals other than a signal of the interference cell and or the serving cell, and
   wherein Ps is a desired signal power,
   wherein the second generic CSI is determined according to:

$$CQI2 = Q(PI/Noc),$$

wherein CQI 2 is the second CSI, and
   wherein PI is the interference signal power, and
   wherein the recalculated CSI is determined according to:

$$CSIR = CSI1(1 + Alpha*CSI2),$$

wherein CSIR is the recalculated CSI, and
   wherein Alpha is a changed interference condition.

2. The method according to claim 1, further comprising determining the interference cell as a neighbor cell having a greatest reference signal received power (RSRP) among at least two neighbor cells having traffic in a CSI reference resource.

3. The method according to claim 1, wherein the second generic CSI is transmitted with the first generic CSI in a subframe as a difference value from the first generic CSI if a rank of the UE is 1.

4. The method according to claim 1, further comprising:
   determining that transmission of the first generic CSI and the second generic CSI is enabled if the UE is limited to a rank 1 by codebook subset restriction; and
   determining that transmission of the first generic CSI and the second generic CSI is disabled if the UE is not limited to a rank 1 by codebook subset restriction.

5. The method according to claim 1, wherein the received data is generated based on CSI recalculated at a the second time based on the first generic CSI and the second generic CSI.

6. The method according to claim 1, wherein the second generic CSI is provided to the serving cell via a backhaul link at time between the first time and the second time.

7. A user equipment (UE) configured to remove interference and receive data in a wireless communication system, the UE comprising:
   radio frequency (RF) units each configured to transmit and receive signals; and
   a processor configured to:
   control the RF units to transmit first generic channel state information (CSI) to a serving cell, the first generic CSI generated at a first time based on a desired signal power from the serving cell;
   control the RF units to transmit second generic CSI to an interference cell, the second generic CSI generated at the first time based on an interference signal power from the interference cell;
   control the RF units to receive data from the serving cell at a second time, the data subject to an interference condition changed after the first generic CSI and the second generic CSI are transmitted; and
   perform data demodulation of the received data at the second time,
   wherein the received data is based on the transmitted first generic CSI and the second generic CSI,
   wherein the first generic CSI is determined according to:

$$CQI1 = Q(Ps/Noc),$$

wherein CQI 1 is the first CSI,
   wherein Q is a quantization function,
   wherein Noc is a power of signals other than a signal of the interference cell or the serving cell, and
   wherein Ps is a desired signal power,
   wherein the second generic CSI is determined according to:

$$CQI2 = Q(PI/Noc),$$

wherein CQI 2 is the second CSI, and
   wherein PI is the interference signal power, and
   wherein the recalculated CSI is determined according to:

$$CSIR = CSI1(1+Alpha*CSI2),$$

wherein CSIR is the recalculated CSI, and
   wherein Alpha is a changed interference condition.

8. The UE according to claim 7, wherein the processor is further configured to determine the interference cell as a neighbor cell having a greatest reference signal received power (RSRP) among at least two neighbor cells having traffic in a CSI reference resource.

9. The UE according to claim 7, wherein the second generic CSI is transmitted with the first generic CSI in a subframe as a difference value from the first generic CSI if a rank of the UE is 1.

10. The UE according to claim 7, wherein the processor is further configured to:
    determine that transmission of the first generic CSI and the second generic CSI is enabled if the UE is limited to a rank 1 by codebook subset restriction; and
    determine that transmission of the first generic CSI and the second generic CSI is disabled if the UE is not limited to a rank 1 by codebook subset restriction.

11. The UE according to claim 7, wherein the received data is generated based on CSI recalculated at a the second time based on the first generic CSI and the second generic CSI.

12. The UE according to claim 7, wherein the second generic CSI is provided to the serving cell via a backhaul link at a time between the first time and the second time.

* * * * *